United States Patent

Lewis et al.

[15] 3,687,017
[45] Aug. 29, 1972

[54] SERVO-ACTUATOR MECHANISM

[72] Inventors: Ivor James Lewis, Aston; John T. Stone, Philadelphia, both of Pa.

[73] Assignee: Westinghouse Electric Corporation, Pittsburgh, Pa.

[22] Filed: Dec. 8, 1970

[21] Appl. No.: 95,996

[52] U.S. Cl..................................92/165, 251/63.6
[51] Int. Cl..................................F01b 1/00
[58] Field of Search ......92/165, 168; 251/63.5, 63.6; 272/24, 64

[56] References Cited

UNITED STATES PATENTS

| | | | |
|---|---|---|---|
| 2,696,361 | 12/1954 | Jensen | 251/63.6 |
| 3,084,945 | 4/1963 | Alexander | 277/24 |
| 1,786,948 | 12/1930 | Hoyt | 92/165 |
| 3,224,817 | 12/1965 | Miller | 277/24 |

FOREIGN PATENTS OR APPLICATIONS 955,847  11/1947  France..........................92/165

*Primary Examiner*—Martin P. Schwadron
*Assistant Examiner*—Ronald H. Lazarus
*Attorney*—A. T. Stratton, F. P. Lyle and F. Cristiano, Jr.

[57] ABSTRACT

A seal bushing and rod bearing for the piston rod of a servo-actuator of a pull type are mounted externally of the actuator cylinder to provide additional sealing in case of failure of the conventional high pressure seals and to provide better guidance for the piston rod to minimize rod seal wear. The length of the external housing for the seal bushing and the rod bearing is greater than the stroke length of the actuator, thereby protecting the conventional sealing surface of the piston rod against mechanical damage.

7 Claims, 1 Drawing Figure

Patented Aug. 29, 1972
3,687,017
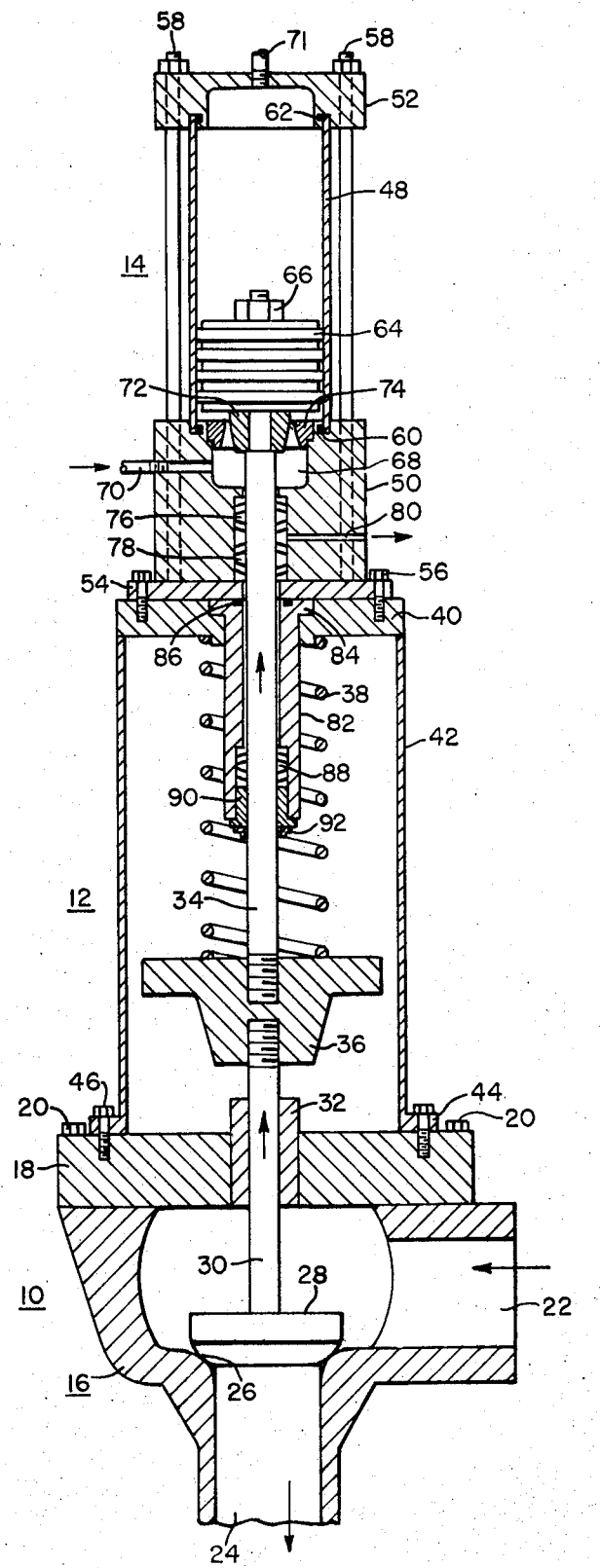

SERVO-ACTUATOR MECHANISM

BACKGROUND OF THE INVENTION

This invention relates, generally, to servo-actuator mechanisms and, more particularly, to hydraulic actuators suitable for actuating the control valve for a steam turbine.

In order to safely mount a hydraulic actuator of a pull type directly above a spring housing in line with the control valve for a steam turbine, it is necessary to eliminate the risk of the high pressure operating fluid leaking from the piston rod exit onto the external parts. In the present mechanism, provision is made for additional external sealing, guiding, and rod protection by mounting an extension head at the rod end of the actuator cylinder.

BRIEF SUMMARY OF THE INVENTION

In accordance with one embodiment of the invention, a cylindrical seal and bearing housing is externally mounted at the rod exit end of a hydraulic actuator cylinder which is mounted on a spring housing directly above a control valve for a steam turbine. A seal bushing and a rod bearing for the piston rod are mounted in the cylindrical housing at its lower end to provide additional external sealing and guiding for the piston rod. The length of the cylindrical housing is greater than the stroke length of the actuator. Thus, the surface of the piston rod contacted by the high pressure seals at the exit end of the actuator cylinder is protected against mechanical damage.

BRIEF DESCRIPTION OF THE DRAWING

For a better understanding of the nature of the invention, reference may be had to the following detailed description, taken in conjunction with the accompanying drawing, in which the single FIGURE is a view, in longitudinal section, of a valve structure actuated by a servo-actuator mechanism embodying principal features of the invention.

DESCRIPTION OF PREFERRED EMBODIMENT

Referring to the drawing, the structure shown therein comprises a steam control valve 10, a spring housing and support column 12 mounted on the valve 10, and a hydraulic actuator 14 mounted on the spring housing 12 directly above and in line with the valve 10. The valve 10 may be of a type well known in the art suitable for controlling the flow of steam to a steam turbine. The valve includes a generally cupshaped body 16 and a cover 18 attached to the body 16 by bolts 20. The body 16 has an inlet port 22 and an outlet port 24. The inlet port 22 may be connected to a suitable supply of steam (not shown) and the outlet port 24 may be connected to a steam turbine (not shown). A valve seat 26 is provided at the inner end of the outlet port 24.

As shown, the outlet port 24 is closed by a valve member 28 of the plug type seated in the valve seat 26. The valve member 28 has a stem 30 extending upwardly through a bearing 32 mounted in the valve cover 18. The upper end of the valve stem 30 is attached to the lower end of a piston rod 34 by means of a coupling member 36 disposed inside the spring housing 12. The coupling 36 also serves as a support for a plurality of concentric helical springs 38, only one of which is shown, which bias the valve member 28 to its closed position. The springs 38 extend between the coupling member 36 and a cover 40 of the spring housing 12. The cover 40 may be secured to a cylindrical wall 42, as by welding. The wall 42 has a flange 44 at its lower end attached to the cover 18 by bolts 46.

The hydraulic actuator 14 is of a pull type generally well known in the art. The actuator 14 includes a cylinder 48 extending between a base 50 and a cylinder head 52. The base 50 is mounted on a seal ring 54 attached to the cover 40 of the spring housing 12 by means of bolts 56. The base 50 and the cylinder head 52 are attached to the seal ring 54 by means of through bolts 58. The cylinder 48 is retained between the base 50 and the cylinder head 52 by means of the bolts 58. O-ring seals 60 and 62 are provided where the cylinder 48 is seated in the base 50 and the head 52, respectively. A piston 64 is attached to the upper end of the piston rod 34 by means of a nut 66. A pressure chamber 68 is provided in the base 50 for receiving a pressurized fluid through a pipe 70. The pipe 70 may be connected to any suitable supply of pressurized fluid (not shown).

When the pressurized fluid is admitted to the chamber 68, the piston 64 is forced upwardly to compress the spring means 38 and raise the valve member 28 from the valve seat 26. Back pressure on the piston is prevented by a vent 71 in the cylinder head. When the pressure fluid is released from the chamber 68, the piston 64 is forced downwardly by the spring means 38, thereby closing the valve member 28.

In order to absorb part of the energy stored in the spring means 38 and to reduce the shock on the valve member 28, a tapered sleeve 72 is secured to the piston rod 34 below the piston 64 and a tapered ring 74 is mounted in the base 50 at the outlet of the chamber 68. Thus, as the piston 64 travels downwardly, the actuating fluid in the cylinder 48 is forced to flow through a restricted area between the sleeve 72 and the ring 74, thereby retarding the downward movement of the piston at the lower portion of its travel to reduce the shock on the valve member 28 seating in the valve seat 26.

As explained hereinbefore, it is essential that leakage of the pressurized fluid from the actuator 14 be prevented. In order to accomplish this, upper seal means 76 and lower seal means 78 are provided around the piston rod 34 at the exit end of the actuator 14. The seals 76 and 78 are of a high pressure type well known in the art. The seals are retained in position in the base 50 by the seal ring 54. A drainage passageway 80 extends through the base 50 to the space between the seals 76 and 78.

With a view to still further decreasing the possibility of leakage from the actuator, a generally cylindrical housing 82 is disposed around the piston rod 34 below the exit end of the actuator 14. As shown, the housing 82 extends downwardly into the spring housing 12 within the spring means 38. The housing 82 has an outwardly extending flange 84 at its upper end which is seated in the cover 40 of the spring housing 12. The flange 84 is engaged by the seal ring 54 to retain the housing 82 in position. An O-ring seal 86 is provided at the joint between the flange 84 and the seal ring 54. Additional seal means 88 is provided around the piston rod 34 within the cylindrical housing 82.

As shown, the seal 88 is spaced below the exit end of the actuator a distance which is at least equal to the length of the stroke of the actuator. Thus, the length of the housing 82, which contains the seal 88, is greater than the stroke of the actuator so that the surface of the piston rod 34 which contacts the high pressure seals 76 and 78 is always contained within the housing 82 and protected from mechanical damage. Therefore, the effectiveness of the seals 76 and 78 is not decreased by the surface of the piston rod becoming damaged.

In order to provide additional guiding for the piston rod 34, a bearing 90 is mounted in the cylindrical housing 82 below the seal 88. Dirt scraping seal means 92 is provided around the rod 34 below the bearing 90, thereby preventing dirt from being carried into the bearing. Thus, the housing 82 and its associated members provide additional seating and guiding for the piston rod 32 and protect the portion of the rod which contacts the high pressure seal means from mechanical damage.

Before assembling the housing 82 to the base 50, the annular space between the O-ring 86 and seals 88 is filled with liquid at atmospheric pressure to provide full immersion of the high pressure seals 76 and 78 for lubrication purposes and to avoid the effects of dry friction wear on the lower portion of the seal 78.

From the foregoing description, it is apparent that the invention provides an actuator mechanism which can be safely mounted above a steam control valve and still contain the oil leakage associated with continuous cyclic operation. It also provides guidance for the actuator rod and minimizes rod seal wear.

We claim as our invention:

1. In a pressurized fluid servo-actuator mechanism having a cylinder with a piston rod extending from an exit end of the cylinder with first sealing means for the piston rod at the exit end, in combination with a housing surrounding the piston rod and extending from the exit end of the cylinder, an annular space between said piston rod and said housing to prevent any contact therebetween, second sealing means for the piston rod disposed within the housing at a distance greater than one stroke length from the first sealing means, the portion of the piston rod passing through said first and second sealing means having a generally constant cross-section, whereby the portion of the piston rod passing through the first sealing means is always enclosed within the housing or within the cylinder to prevent that portion of the piston rod from being contaminated by foreign material, which may cause damage to the piston rod and the first sealing means and thereby prevent said first sealing means from leaking.

2. In a pressurized fluid servo-actuator mechanism as set forth in claim 1 and further comprising in combination drain means associated with the first sealing means and the housing being adapted to be filled with an unpressurized lubricating fluid, whereby the sealing means are lubricated and pressurized fluid leaking through the first seal means flows through the drain means without pressurizing the fluid in the housing, thereby minimizing leakage through the second sealing means.

3. In a pressurized fluid servo-actuator mechanism as set forth in claim 2 and further comprising in combination means for retarding the movement of the piston as the piston rod approaches that end of its stroke wherein the piston rod approaches its fully extended position.

4. In a pressurized fluid servo-actuator mechanism as set forth in claim 2 and further comprising in combination scraping means encompassing the piston rod and disposed outboard of the second sealing means.

5. In a pressurized fluid servo-actuator mechanism as set forth in claim 2 and further comprising in combination bearing means disposed adjacent the second sealing means to provide additional stability to the piston rod.

6. In a pressurized fluid servo-actuator mechanism as set forth in claim 5 and further comprising in combination bias means encompassing said housing, said biasing means being disposed to move said piston rod to its fully extended position, said housing being disposed to act as an internal guide for said bias means.

7. In a pressurized fluid servo-actuator mechanism having a cylinder with a piston rod extending from an exit end of the cylinder with first high pressure sealing means for the piston rod at the exit end, in combination with a housing surrounding the piston rod and extending from the exit end of the cylinder, second sealing means for the piston rod disposed within the housing at a distance greater than one stroke length from the first sealing means, said housing being adapted to be filled with an unpressurized lubricating fluid, drain means associated with the first sealing means so that pressurized fluid flowing therethrough will flow into said drain means and not pressurize said housing, scraping means encompassing the piston rod and disposed outboard of the second sealing means, the portion of the piston rod passing through said first and second sealing means having a generally constant cross-sectional area, whereby that portion of the piston rod which passes through the first sealing means is always lubricated and continuously enclosed within the housing or the cylinder to protect that portion of the piston rod and the first sealing means from foreign material which could damage them.

* * * * *